May 31, 1927.
F. WITTENBERG, JR
CHART
Filed Jan. 25, 1926    2 Sheets-Sheet 1
1,630,916
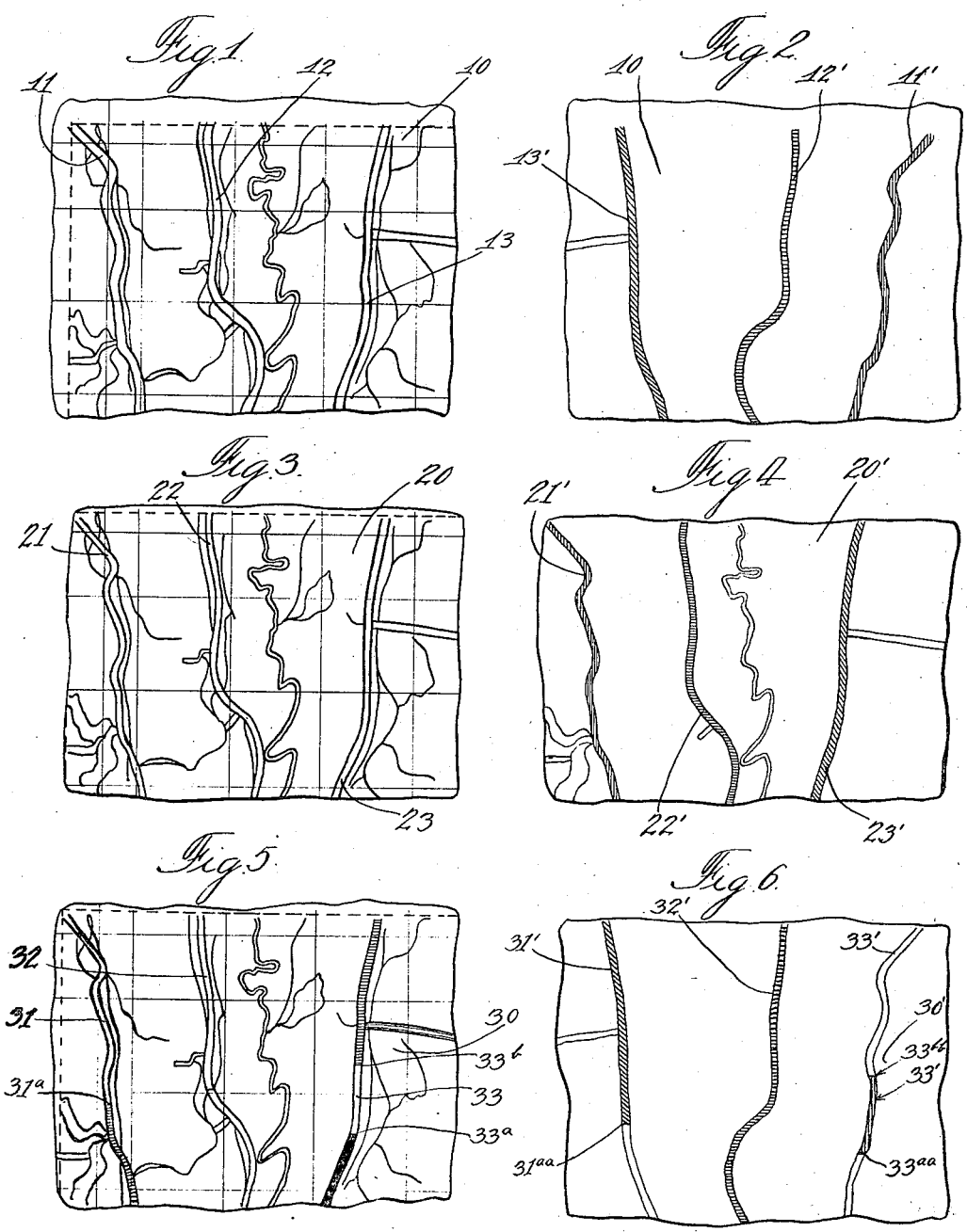

May 31, 1927.  
F. WITTENBERG, JR  
1,630,916  
CHART  
Filed Jan. 25, 1926  
2 Sheets-Sheet 2
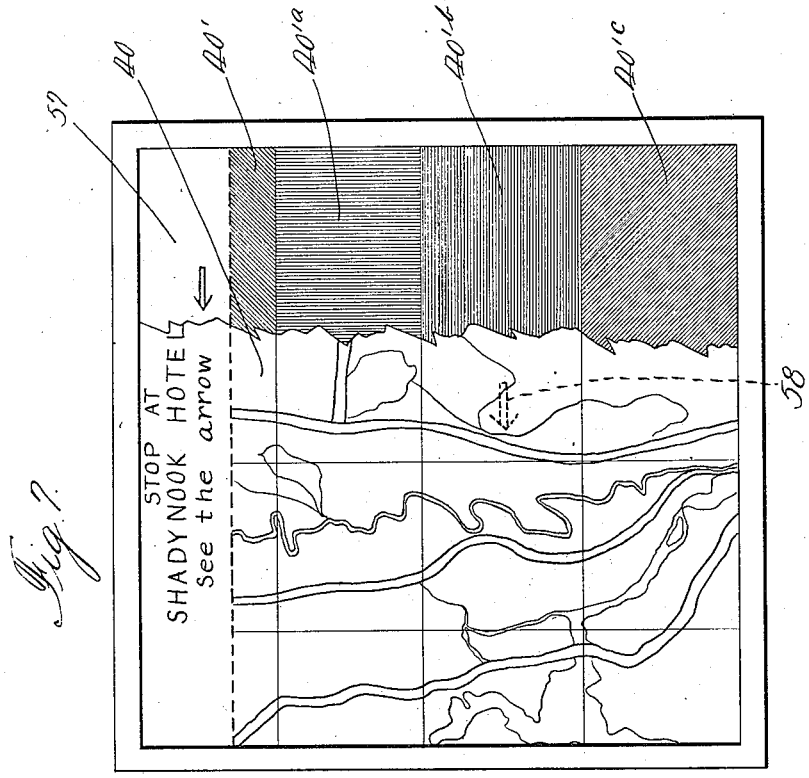
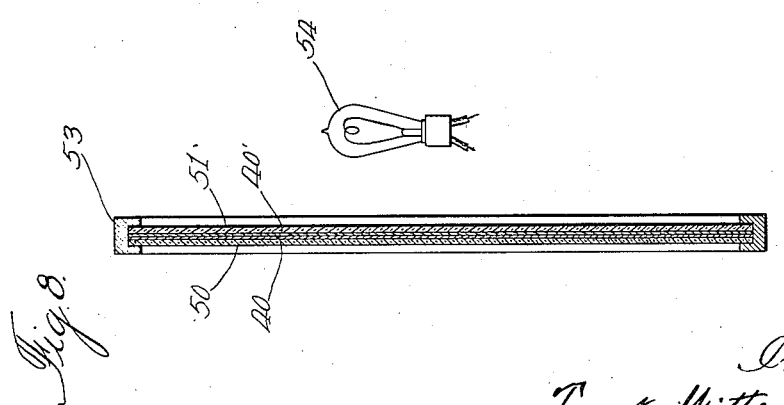
Inventor:  
Frank Wittenberg, Jr.,  
By: Small & Small  
Attys.

Patented May 31, 1927.

1,630,916

UNITED STATES PATENT OFFICE.

FRANK WITTENBERG, JR., OF LITTLE ROCK, ARKANSAS.

CHART.

Application filed January 25, 1926. Serial No. 83,549.

My invention relates to charts and particularly to charts or maps which convey certain information by the display of color or colors on a certain portion of the chart.

The object of the invention is the provision of a chart or map of the above described character on which the display of color or colors may readily be changed from time to time so as to convey different information thereby as conditions change.

Another object of the invention is the arrangement of the colors in association with the chart so as to produce a more artistic appearance.

A still further object resides in the provison of a chart of the above described character which lends itself readily as a carrying medium for advertising matter, which advertising matter may be changed from time to time without destroying the original basic designation on the chart or map.

One of the features of the invention is a shart or map on a sheet of transparent or translucent material and the provision of a color or colors associated with certain portions of the back of said sheet, so that when the face of the sheet is viewed, the colors appear as though applied directly to the characters and designations on the face of the chart.

A further feature is the arrangement of the colored sections on a second sheet of transparent or translucent material which will underlie the sheet first mentioned above, so that when the face of the chart is observed, certain portions of the chart will appear to be colored in the desired manner.

Another feature resides in the provision of color or colors on the face and also the back of the chart, the colors on the face and back blending together to produce an effect more harmonious than can be obtained by placing all the colors either on the face or the back of the chart.

Other features and advantages will appear from time to time as the description of the invention progresses.

The present invention has been found particularly useful in connection with maps showing highways or roads, the color scheme being employed to indicate the condition of the various sections of road, although the scheme will be found useful in connection with many other kinds of charts.

In connection with "road maps" it is desirable to color certain sections of the roads so as to indicate, by a color code, the character or condition of the respective sections. For instance, a gravel road may be colored blue, a dirt road may be colored green, a road under construction may be colored red, etc. As the road conditions change, it becomes desirable to change the color designations on the map. When however, the color is placed on the face of the map, it becomes exceedingly difficult, if not impossible, to change the color scheme without damaging or destroying the designations indicating the position of the roads on the face of the map; thus leaving the map confusing and unattractive. In the present invention, the basic map is made on a sheet of transparent or translucent material, as tracing cloth, tracing paper, or the like, and the color scheme is applied to the back of the map, or to a separate sheet of translucent paper, on which the map as superimposed, the color at the back of the map showing through so as to be plainly visible in connection with the designations on the face thereof.

If the colors are applied at the back of the map by means of water colors, or the like, they may be removed readily with a damp sponge or cloth, and the color scheme altered from time to time without damage to the basic map on the face of the sheet.

It is believed a further disclosure of the invention will be understood most readily from a description thereof taken in connection with the accompanying drawings, in which:

Fig. 1 is a view of the face of a portion of a map or chart in accordance with the present invention;

Fig. 2 is a view of the back of Fig. 1, showing the colors applied thereto;

Fig. 3 is a view of a portion of a map similar to that of Fig. 1, but without the color applied to the back thereof;

Fig. 4 is a view of a sheet carrying the color scheme adapted to be placed under the sheet of Fig. 3;

Fig. 5 is a view similar to Figs. 1 and 3, but shows a portion of the color scheme applied to the face of a map;

Fig. 6 shows a sheet adapted to be placed under the sheet of Fig. 5;

Fig. 7 shows another modification comprising a rear sheet with bands of colors applied thereto and an outer sheet carrying the basic map designation superimposed on the other sheet, the two sheets being mounted within a frame or support, and Fig. 8 is a vertical section through the arrangement shown in Fig. 7 and further illustrates the association with the map of an electric light which will render the matter plainly discernible at night.

Referring now to the drawings, in which like reference characters indicate the same parts in the several views: 10 indicates a sheet of transparent or translucent material, as tracing cloth or tracing paper, upon which appears in black the lines and other designations designating a portion of a map.

The lines and designations may be produced on sheet 10 from an original or ordinary map in the following manner: The usual map will be made semi-transparent by means of a fluid commonly used for this purpose. This semi-transparent map will then be employed to make a negative, commonly called a Vandyke, from which the map is created on the fabric or tracing paper by a common and well known printing process. It will thus be seen that the face of the sheet 10 in Fig. 1 is in black and white and the dark lines are permanently printed into the fabric or paper.

In road maps, as above explained, it is desirable to show the character and conditions of the different stretches of road. By the present invention this may be accomplished by applying to the back of the sheet 10 of Fig. 1, colored stripes which underlie the road and other designations on the map and are plainly visible through the translucent material. For instance, the red line 11' on the face of sheet 10 will exactly underlie the road designation 11 on the face of sheet 10, the blue line 12' on the back may underlie the road designation 12 on the face and the green designation 13' on the back may underlie the road designation 13. Thus when the face of the map is observed, as in Fig. 1, the colored lines 11', 12' and 13' will clearly show through the fabric and display the desired designation in connection with these particular sections of the road.

As above explained, the color designations on the back of the map can readily be removed by means of a damp sponge or cloth and replaced by another color. Thus, if the road 11, appearing in the red, which, for instance, may indicate a road under construction, is completed, or a portion of it is completed, the red may be removed and some other color, such as black, may be substituted therefor to indicate a completed cement road.

The translucent sheet 20 of Fig. 3 may be like the sheet 10 of Fig. 1, except the color designations will not be applied to the back of sheet 20 in this form of the invention. In carrying out this modification, the sheet 20' of Fig. 4 may have on it a map, similar to that on sheet 20, but relatively light or indistinct and the colors will be applied to the road designations on sheet 20'. Sheet 20 will then be placed above sheet 20' with the lines of sheet 20 exactly overlying the coresponding lines of sheet 20', the two pieces of fabric 20 and 20' being held in intimate contact in any desired manner, as for instance by being placed between sheets of glass. The road designations 21' of Fig. 4 may be red, the road designation 22' may be blue and the road designation 23' green, in accordance with the above descriptions of the map of Figs. 1 and 2.

Now if the road 21, which is indicated as under construction by the red color, is completed, the sheet 20' may be removed, the red color wiped off from line 21' and another color, such as black to indicate a completed cement road, be substituted for the red.

In Figs. 5 and 6, a further modification is shown. Sheet 30 of Fig. 5 is of translucent material like the sheet 10 of Fig. 1, and has thereon a similar basic map designation. In this form of the invention, however, portions of the color designations may be applied to of the face of sheet 30, while other color designations may be applied either to the back of sheet 30 or to another sheet, as 30', of Fig. 6. Sheet 30' of Fig. 6 may be, in all respects, like sheet 20' of Fig. 4, except it will carry only a portion of the color designations. Thus the road 31 of Fig. 5 may be colored blue below point $31^a$, as indicated, and be uncolored above point $31^a$.

On Fig. 6, the corresponding road 31' may be colored green above point $31^{aa}$ and uncolored below this point. By using this arrangement, it is found that, where the colors join, they blend one into the other and produce a neater and more harmonious appearance.

Referring again to Fig. 5, it will be seen that road 32 is uncolored. Road 33 is colored black up to point $33^a$ and blue down to point $33^b$, the space between points $33^a$ and $33^b$ being uncolored. On Fig. 6, road designation 32' is colored blue and 33' is colored red between points $33^{aa}$ and $33^{bb}$ but is otherwise uncolored.

In Fig. 7, two sheets 40 and 41' are shown. Sheet 40 may be a map such as shown in Fig. 1, with the color designations applied to the back thereof, or it may be like that shown in Fig. 3. Sheet 40' is of transparent or translucent material and may have on one side thereof bands or blocks of color, such as $40'^a$, $40'^b$, $40'^c$, etc. These colored areas may be for a purely ornamental or artistic purpose, or may be employed to designate geographical divisions, as counties, or conditions of certain sections etc.

In Fig. 8, sheet 40 and 40' are shown secured between two glass plates 50 and 51 mounted in a frame 53. At 54 is indicated an electric light bulb placed behind the map to render the color scheme and map designations more clearly visible.

When sheets 40 and 40' are placed together and viewed toward a light, the colors of sheet 40' are subdued and blended together where they meet producing a very attractive appearance. If the face of sheet 40', having the colored areas thereon, is turned away from sheet 40, that is the two sheets are arranged back to back, the colors are somewhat more diffused and appear more delicate and more perfectly blended together along the lines where they meet. The colored areas will, however, be clearly visible in connection with the map on the face of sheet 40. When the sheets are turned back to back, as just described, the back of sheet 40' may have thereon color designations similar to sheet 20' shown in Fig. 4. With this arrangement, the color designations of the roads will be clearly visible and will stand out against the colored areas on the face of sheet 40'. In fact when viewed toward a light, if the designations on the opposite sides of sheet 40' are of contrasting colors, these colors stand out very clearly, yet do not obscure, in any manner, the basic designations on the face of sheet 40 and even if of substantially the same color, they are clearly visible due to the greater color density where the similar colors overlie one another.

By using the expedient herein disclosed, the map or chart may be used as a medium to carry advertising matter without, in any way, mutilating the basic designation on the face of the map. For instance, some advertisement, as the hotel notice at the top of Fig. 7, may be placed on rear sheet 40' without interfering with the map or sheet 40. The advertising matter may be placed outside of, that is, at the margin of the map on sheet 40, as shown in Fig. 7, or it may be made to underlie the map of sheet 40, in which case, it will be clearly visible yet will not obscure the map. If desired, the strip 57 at the top of the sheet 40', above the dotted line, may be made separate to permit this portion of the sheet to be changed at will.

As many uses for the present invention will readily appear, it seems unnecessary to go into greater detail in regard to the manner in which it may be used for advertising and display purposes.

The fundamental idea underlying the invention will be found useful with many charts other than road maps; also, many modifications, other than these herein disclosed, are contemplated. The invention, therefore, should be limited only by the scope of the appended claims.

It should be understood that the word transparent used throughout the claims is to be construed to include all sheet materials, either transparent, semi-transparent or translucent, as set forth in the specification above.

Having thus described my invention, what I claim as new and desire to secure by Letters Patent of the United States is:

1. In a chart, a sheet of transparent material, basic designations on the face of said sheet and color designations at the back of such sheet and arranged to underlie and modify basic designations on the face thereof.

2. In a chart, a sheet of transparent material, basic designations on the face of said sheet and color designations of water color or the like at the back of said sheet and arranged to underlie and modify basic designations on the face thereof.

3. In a chart, a sheet of transparent substantially water-proof material, basic designations on the face of said sheet and color designations at the back of said sheet and arranged to underlie and modify basic designations on the face thereof, said color designations being of water color or the like whereby they may be removed readily.

4. In a chart, a sheet of transparent material, basic designations on the face of said sheet, a second sheet of transparent material and color designations on said second sheet arranged to underlie and modify portions of the designations on said first mentioned sheet.

5. In a chart, a sheet of transparent material, basic designations on the face of said sheet, a second sheet of transparent substantially water-proof material, color designations on said second sheet, said color designations being arranged to underlie and modify portions of the designations on the first mentioned sheet, the color designations on the said second mentioned sheet being of water color or like material whereby said color designations may be removed readily.

6. In a chart, a sheet of transparent material, basic designations on the face of said sheet, color designations on the face of said sheet and color designations at the back of such sheet and arranged to underlie and modify designations on the face thereof.

7. In a chart, a sheet of transparent substantially water-proof-material, basic designations on the face of said sheet, color designations on the face of said sheet, and color designations at the back of said sheet arranged to underlie and modify designations on the face thereof, said color designations at the back of said sheet being of water color or the like whereby they may readily be removed.

8. In a chart, a sheet of transparent material, basic designations on the face of said sheet, color designations on the face of said sheet, a second sheet of transparent material and color designations on said second sheet arranged to underlie and modify portions of the designations on said first mentioned sheet.

9. In a chart, a sheet of transparent material, basic designations on the face of said sheet, color designations on the face of said sheet, a second sheet of transparent substantially water-proof material, color designations on said second sheet, said color designations being arranged to underlie and modify portions of the designations on the first mentioned sheet, the color designations on the said second mentioned sheet being of water color or like material whereby they may be removed readily.

10. In a road map, a sheet of transparent material, basic designations indicating roads on the face of said sheet and color designations at the back of such sheet arranged to underlie and modify basic designations on the face thereon.

11. In a road map, a sheet of transparent material, basic designations, indicating roads on the face of said sheet and color designations of water color or the like at the back of said sheet arranged to underlie and modify road designations on the face thereof.

12. In a road map, a sheet of transparent material, basic designations indicating roads on the face of said sheet, a second sheet of transparent material and color designations on said second sheet arranged to underlie and modify portions of the road designations on said first mentioned sheet.

13. In a road map, a sheet of transparent material, basic designations showing roads on the face of said sheet, a second sheet of transparent substantially water-proof material, color designations on said second sheet, said color designations being arranged to underlie and modify portions of the road designations on the first mentioned sheet, the color designations on the said second mentioned sheet being of water color or like material whereby said color designations may be readily removed.

In testimony whereof I have signed this specification.

FRANK WITTENBERG, Jr.